F. EGGE & F. W. SMITH,

Assignors to THE SMITH & EGGE MANUFACTURING CO.

Lock for Drawers.

No. 9,685. Reissued April 26, 1881.

Witnesses.

Robert Everett.

F. W. Smith Jr.

Inventors.

Frederick Egge

Friend W. Smith by Wm. R. W. Sutre, Atty.

N. PETERS, PHOTO-LITHOGRAPHER, WASHINGTON, D. C.

UNITED STATES PATENT OFFICE.

FREDERICK EGGE AND FRIEND W. SMITH, OF BRIDGEPORT, CONNECTICUT, ASSIGNORS TO THE SMITH & EGGE MANUFACTURING COMPANY, OF SAME PLACE.

LOCK FOR DRAWERS.

SPECIFICATION forming part of Reissued Letters Patent No. 9,685, dated April 26, 1881.

Original No. 190,297, dated May 1, 1877. Application for reissue filed February 28, 1881.

*To all whom it may concern:*

Be it known that we, FREDERICK EGGE and FRIEND W. SMITH, both of Bridgeport, in the county of Fairfield and State of Connecticut, have invented certain new and useful Improvements in Locks, of which the following is a specification.

Our invention, while more especially relating to a sewing-machine-drawer lock, relates generally to locks of the class which have pivoted, turning, or oscillating cams or hubs, engaged and operated directly by keys and acting upon the bolts to shoot or retract them.

The object of our invention mainly is to improve such hubs or cams; to which end our improvement consists in forming the hub of sheet metal in sections by stamping and uniting the parts, as will hereinafter more specifically be designated.

Our object, further, is to provide a simple effective drawer-lock for sewing-machines; to which end our improvement consists in a novel construction and combination of parts, hereinafter specifically set forth.

The accompanying drawings show several hubs or cams, all constructed in accordance with our invention, but differing somewhat in form or outline to adapt them to the different locks to which they are suited, and two such locks with the cams in place.

Figure 4:
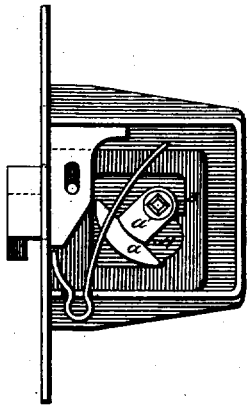
Figure 5:
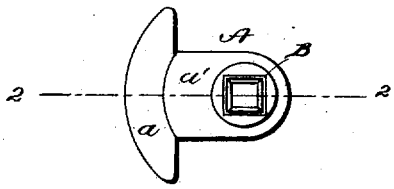
Figure 7:
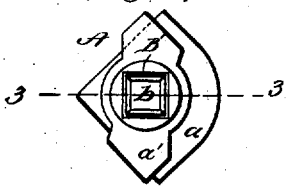
Figure 9:
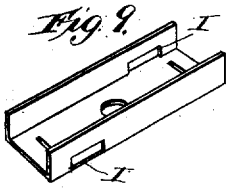
Figure 6:
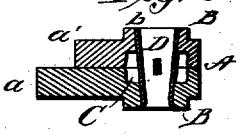
Figure 3:
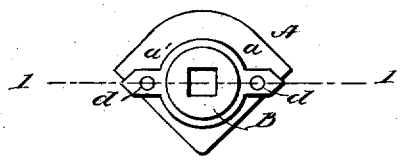
Figure 8:
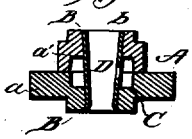
Figure 1:
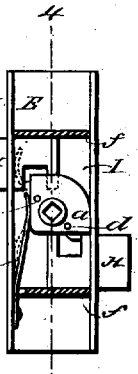
Figure 1A:
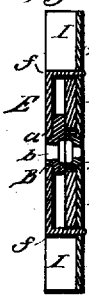
Figure 2:
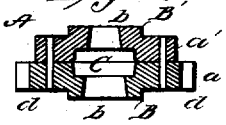

Figure 1 is a view of a drawer-lock, with its casing partly in section; Fig. 1[a], a section through the same on the line 4 4 of Fig. 1. Figs. 2 and 3 are views, on an enlarged scale, of the hub shown in Fig. 1, Fig. 2 being in section on the line 1 1 of Fig. 3. Fig. 4 is a view of a cover or lid lock, with a portion of the casing removed. Figs. 5 and 6 are views, on an enlarged scale, of the hub shown in Fig. 4, Fig. 6 being in section on the line 2 2 of Fig. 5. Figs. 7 and 8 are views of hub or cam of a form somewhat differing from the others, the latter figure being in section on the line 3 3 of the former; and Fig. 9, a perspective view of part of the case.

Similar letters indicate like parts in the several figures.

Each hub or cam A is composed of two main parts or sections, *a a'*, stamped out of sheet metal. Each of these sections is made at a single operation, the hollow trunnion or pivotal support B B' being formed by displacing at a single blow of the punch the metal at and around the opening *b* for the key. The depressions made upon these sides or faces of the sections, which become their inner or contiguous surfaces when the sections are united, form central chambers or hollows, C, in the hub. Thus not only is the hub made of less metal and much lighter than when cast or made of a single piece of metal, but provision is made for the insertion and retention of a spring or yielding bushing around the key-hole or opening in the hub, which, by creating friction upon the key-stem or portion which enters the tubular hub, effectually prevents the jolting out or accidental dropping of the key from the lock, and, in addition, the necessity for "tumbling" the castings and milling the working-faces is dispensed with.

The sections *a* and *a'* are arranged one upon the other, and are confined, when the lock is assembled, between the plates or frame of the lock; and in order that they shall be kept in proper axial relation to each other, I employ rivets or pins *d d*, or a tubular lining or sleeve, D, for the key-hole; or, if deemed desirable, both methods of securing the sections in position may be employed. By tapering the sleeve D, as shown at Figs. 6 and 8, but one end (the small end) need be clinched or struck up.

An opening in the hub-shell D may be made, as shown in Figs. 6 and 8, to allow the spring or yielding key-hole bushing to bear against the key when in place.

The hub or cam is supported by its trunnions in the lock-case, and is rocked by means of a key having a square stem or end to operate the bolt or bolts of the lock, accordingly as a single or double bolt is employed.

Fig. 1[a] shows a drawer-lock case of peculiar construction, in which one side and two edges of the assembly of parts are covered by a single open-ended trough-like cap or plate, E, the casing or covering being completed by a second plate, F, the ends *f f* of which are bent at right angles and pass through slots in the trough-like plate E. A very simple and inexpensive case is thus produced, no screws or rivets being employed, and the interior of the lock is protected against sawdust, chips, &c.

A spring, G, bearing at its outer end upon the hub, holds the bolts H H, which work through slots I I in the sides of the trough-like plate E, either in their shot or retracted position, and prevents them from being accidentally retracted by the jarring, shaking, or tilting of the machine to which the locks are applied.

We have shown or described the hub or cam as made up of two main parts or sections; but obviously it may be made of a greater number of sections. For instance, if it be desired to increase the size of the center chamber, an additional piece or section may be used and placed between the parts *a a'*, and the whole united by riveting, or by any other equivalent means, such as screws, brazing, &c.

Instead of the spring G, secured at one end and bearing at its opposite end upon the hub, a loose plate-spring, such as represented by dotted lines, Fig. 1, may be used at its center upon the hub.

We are aware that revolving escutcheon-plates have been made of sheet metal, and one of such plates secured each side of the front plate of a lock and connected together by rivets, so that the two escutcheon-plates may be rotated by a key, and we do not wish to have our invention construed as covering any such device, as it relates to an entirely different class of structure—viz., revolving hubs or cams for locks, acting directly upon the bolts to shoot or retract them.

We claim as our invention—

1. A bolt-actuating sheet-metal hub or cam, made in two or more parts, adapted to be secured in proper axial relation to one another, and provided with holes to receive an operating-key, substantially as hereinbefore set forth.

2. A hub or cam for locks, constructed of two or more separately-made sections, with hollow trunnions B B', formed by the displacement of metal at and around the key-opening, as set forth.

3. A sectional lock hub or cam composed of two or more main parts stamped out of sheet metal, recessed upon their inner sides or contiguous surfaces to form a central chamber, and secured together by riveting or otherwise, substantially as hereinbefore set forth.

4. The combination, with the open-ended trough-like back or plate E, of the covering-plate F, with ends *f f* at right angles, and secured to the plate F, forming a complete lock-case, as set forth.

5. The combination of the trough-like lock-plate, the cap or covering-plate, having ends which project through and are headed against the lock-back, and the cam or hub, mounted in said back and plate and operating upon the bolts, substantially as hereinbefore set forth.

In testimony whereof we have hereunto set our hands this 14th day of February, A. D. 1881.

FREDERICK EGGE.
FRIEND W. SMITH.

In presence of—
ROBERT S. SEWARD,
ISAAC LEE FERRIS.